US010452531B1

(12) United States Patent
Jung et al.

(10) Patent No.: US 10,452,531 B1
(45) Date of Patent: Oct. 22, 2019

(54) MEMORY CONTROLLING DEVICE FOR RECONSTRUCTING ORIGINAL DATA USING NON-BLOCKING CODE AND MEMORY SYSTEM INCLUDING THE SAME

(71) Applicants: MemRay Corporation, Seoul (KR); YONSEI UNIVERSITY, UNIVERSITY—INDUSTRY FOUNDATION (UIF), Seoul (KR)

(72) Inventors: Myoungsoo Jung, Incheon (KR); Gyuyoung Park, Incheon (KR)

(73) Assignees: MEMRAY CORPORATION, Seoul (KR); YONSEI UNIVERSITY, UNIVERSITY—INDUSTRY FOUNDATION (UIF), Seoul (KR)

( * ) Notice: Subject to any disclaimer, the term of this patent is extended or adjusted under 35 U.S.C. 154(b) by 0 days.

(21) Appl. No.: 16/296,850

(22) Filed: Mar. 8, 2019

(30) Foreign Application Priority Data

Jun. 29, 2018 (KR) .......................... 10-2018-0075930

(51) Int. Cl.
*G06F 12/02* (2006.01)
*G06F 3/06* (2006.01)
*G06F 9/38* (2018.01)

(52) U.S. Cl.
CPC ........ *G06F 12/0238* (2013.01); *G06F 3/0604* (2013.01); *G06F 3/0644* (2013.01);
(Continued)

(58) Field of Classification Search
CPC .. G06F 12/0238; G06F 3/0644; G06F 3/0647; G06F 9/3877; G06F 3/0604; G06F 3/0679
See application file for complete search history.

(56) References Cited

U.S. PATENT DOCUMENTS 6,240,040 B1    5/2001  Akaogi et al.
8,130,541 B2    3/2012  Kim et al.
(Continued)

FOREIGN PATENT DOCUMENTS

KR    10-2012-0078096    7/2012
KR    10-2014-0102911    8/2014
(Continued)

OTHER PUBLICATIONS

Crit-bit tree. cr.yp.to/critbit.html.
(Continued)

*Primary Examiner* — Francisco A Grullon
(74) *Attorney, Agent, or Firm* — Lex IP Meister, PLLC

(57) ABSTRACT

A memory system including a memory subsystem and a memory controller is provided. The memory subsystem includes a plurality of first memory modules implemented by a phase-change memory and a second memory module implemented by a memory whose write speed is faster than that of the phase-change memory. The memory controller generates a non-blocking code from a plurality of sub-data into which original data are divided, writes the non-blocking code to the second memory module, writes the plurality of sub-data to the plurality of first memory modules, respectively, and reconstructs the original data from some sub-data of the plurality of sub-data which are read from some of the plurality of first memory modules and the non-blocking code read from the second memory under a predetermined condition at a read request.

15 Claims, 12 Drawing Sheets

(52) U.S. Cl.
CPC .......... *G06F 3/0647* (2013.01); *G06F 3/0679* (2013.01); *G06F 9/3877* (2013.01)

(56) References Cited

U.S. PATENT DOCUMENTS

| | | | |
|---|---|---|---|
| 8,266,367 | B2 | 9/2012 | Yu et al. |
| 9,519,540 | B2* | 12/2016 | Atkisson ............... G06F 11/108 |
| 10,048,886 | B2 | 8/2018 | Guddekoppa |
| 2011/0320723 | A1 | 12/2011 | Cohen et al. |
| 2012/0324156 | A1* | 12/2012 | Muralimanohar .. G06F 11/1044 711/104 |
| 2013/0046920 | A1* | 2/2013 | Ryu .................... G06F 12/0246 711/103 |
| 2013/0304970 | A1* | 11/2013 | Parizi .................... G06F 3/0611 711/103 |
| 2013/0307970 | A1 | 11/2013 | Barak et al. |
| 2014/0019674 | A1 | 1/2014 | Park |
| 2015/0363338 | A1 | 12/2015 | Cho et al. |
| 2016/0321013 | A1 | 11/2016 | Park |
| 2017/0168931 | A1 | 6/2017 | Kim et al. |
| 2018/0032251 | A1 | 2/2018 | Jung |
| 2019/0056889 | A1 | 2/2019 | Park |

FOREIGN PATENT DOCUMENTS

| | | |
|---|---|---|
| KR | 10-2015-0144545 | 12/2015 |
| KR | 10-2017-0070920 | 6/2017 |
| KR | 10-2018-0012172 | 2/2018 |

OTHER PUBLICATIONS

Akel, A., Caulfield, A. M., Mollov, T. I., Gupta, R. K., and Swanson, S. Onyx: A prototype phase change memory storage array. HotStorage 1 (2011), 1.

Arulraj, J., Pavlo, A., and Dulloor, S. R. Let's talk about storage & recovery methods for non-volatile memory database systems. In Proceedings of the 2015 ACM SIGMOD International Conference on Management of Data (2015), ACM.

Bae, Y.-C., Park, J.-Y., Rhee, S. J., Ko, S. B., Jeong, Y., Noh, K.-S., Son, Y., Youn, J., Chu, Y., Cho, H., et al. A 1.2 v 30nm 1.6 gb/s/pin 4gb lpddr3 sdram with input skew calibration and enhanced control scheme. In Solid-State Circuits Conference Digest of Technical Papers (ISSCC), 2012 IEEE International (2012), IEEE.

Bailey, K. A., Hornyack, P., Ceze, L., Gribble, S. D., and Levy, H. M. Exploring storage class memory with key value stores. In Proceedings of the 1st Workshop on Interactions of NVM/FLASH with Operating Systems and Workloads (2013), ACM, p. 4.

Chang, J., and Sainio, A. Nvdimm-n cookbook: A soup-tonuts primer on using nvdimm-ns to improve your storage performance, 2015.

Chen, F., Lee, R., and Zhang, X. Essential roles of exploiting internal parallelism of flash memory based solid state drives in high-speed data processing. In High Performance Computer Architecture (HPCA), 2011 IEEE 17th International Symposium on (2011), IEEE.

Chen, Y., Zhao, J., and Xie, Y. 3d-nonfar: Three-dimensional non-volatile fpga architecture using phase change memory. In Low-Power Electronics and Design (ISLPED), 2010 ACM/IEEE International Symposium on (2010), IEEE.

Cho, S., and Lee, H. Flip-n-write: a simple deterministic technique to improve pram write performance, energy and endurance. In Proceedings of the 42nd Annual IEEE/ACM International Symposium on Microarchitecture (2009), ACM.

Coburn, J., Caulfield, A. M., Akel, A., Grupp, L. M., Gupta, R. K., Jhala, R., and Swanson, S. Nv-heaps: making persistent objects fast and safe with next-generation, non-volatile memories. ACM Sigplan Notices 46, 3 (2011), 105-118.

Cooperation, I. Intel architecture instruction set extensions programming reference. Intel Corp., Mountain View, CA, USA, Tech. Rep (2016), 319433-030.

Grupp, L. M., Davis, J. D., and Swanson, S. The hareytortoise: Managing heterogeneous write performance in ssds. In USENIX Annual Technical Conference (2013).

Ielmini, D., Lavizzari, S., Sharma, D., and Lacaita, A. L. Physical interpretation, modeling and impact on phase change memory (pcm) reliability of resistance drift due to chalco-genide structural relaxation. In Electron Devices Meeting, 2007. IEDM 2007. IEEE International (2007), IEEE.

Intel Corporation. Persistent memory programming. http://pmem.io.

Intel Corporation. Intel optane technology. https://www.intel.com/content/www/us/en/architecture-and-technology/intel-optane-technology.html, 2016.

Jung, M. Exploring parallel data access methods in emerging non-volatile memory systems. IEEE Transactions on Parallel and Distributed Systems 28, 3 (2017), 746-759.

Jung, M. Nearzero: An integration of phase change memory with multi-core coprocessor. IEEE Computer Architecture Letters 16, 2 (2017), 136-140. https://www.intel.com/content/www/us/en/architecture-and-technology/intel-optane-technology.html.

Jung, M., and Kandemir, M. T. An evaluation of different page allocation strategies on high-speed ssds. In HotStorage (2012).

Jung, M., Shalf, J., and Kandemir, M. Design of a large-scale storage-class rram system. In Proceedings of the 27th international ACM conference on International conference on super-computing (2013), ACM.

Kang, M., Park, T., Kwon, Y., Ahn, D., Kang, Y., Jeong, H., Ahn, S., Song, Y., Kim, B., Nam, S., et al. Pram cell technology and characterization in 20nm node size. In Electron Devices Meeting (IEDM), 2011 IEEE International (2011), IEEE.

Kang, S., Cho, W. Y., Cho, B.-H., Lee, K.-J., Lee, C.-S., Oh, H.-R., Choi, B.-G., Wang, Q., Kim, H.-J., Park, M.-H., et al. A 0.1um 1.8-v 256-mb phase-change random access memory (pram) with 66-mhz synchronous burst-read operation. IEEE Journal of Solid-State Circuits 42, 1 (2007), 210-218.

Kim, K.-H., Gaba, S., Wheeler, D., Cruz-Albrecht, J. M., Hussain, T., Srinivasa, N., and Lu, W. A functional hybrid memristor crossbar-array/cmos system for data storage and neuromorphic applications. Nano letters 12, 1 (2011), 389-395.

Laforest, C. E., and Steffan, J. G. Efficient multiported memories for fpgas. In Proceedings of the 18th annual ACM/SIGDA international symposium on Field programmable gate arrays (2010), ACM.

Lee, B. C., Ipek, E., Mutlu, O., and Burger, D. Architecting phase change memory as a scalable dram alternative. In International Symposium on Computer Architecture (ISCA) (2009).

Linn, E., Rosezin, R., Kugeler, C., and Waser, R. Complementary resistive switches for passive nanocrossbar memories. Nature materials 9, 5 (2010), 403.

Liu, S., Kolli, A., Ren, J., and Khan, S. Crash consistency in encrypted non-volatile main memory systems.

Minh, C. C. Designing an effective hybrid transactional memory system. Stanford University, 2008.

Nalli, S., Haria, S., Hill, M. D., Swift, M. M., Volos, H., and Keeton, K. An analysis of persistent memory use with whisper. In Proceedings of the Twenty-Second International Conference on Architectural Support for Programming Languages and Operating Systems (2017), ACM.

Ovshinsky, S. R. Reversible electrical switching phenomena in disordered structures. Physical Review Letters 21, 20 (1968), 1450.

Park, H., Yoo, S., and Lee, S. Power management of hybrid dram/pram-based main memory. In Design Automation Conference (DAC), 2011 48th ACM/EDAC/IEEE (2011), IEEE.

Park, S.-H., Park, J.-W., Kim, S.-D., and Weems, C. C. A pattern adaptive nand flash memory storage structure. IEEE transactions on computers 61, 1 (2012), 134-138.

Park, S.-Y., Seo, E., Shin, J.-Y., Maeng, S., and Lee, J. Exploiting internal parallelism of flash-based ssds. IEEE Computer Architecture Letters 9, 1 (2010), 9-12.

Qureshi, M. K., Franceschini, M. M., Jagmohan, A., and Lastras, L. A. Preset: improving performance of phase change memories by exploiting asymmetry in write times. ACM SIGARCH Computer Architecture News 40, 3 (2012).

(56) References Cited

OTHER PUBLICATIONS

Qureshi, M. K., Srinivasan, V., and Rivers, J. A. Scalable high performance main memory system using phase-change memory technology. In International Symposium on Computer Architecture (ISCA) (2009).

Redaelli, A., Pirovano, A., Pellizzer, F., Lacaita, A., Ielmini, D., and Bez, R. Electronic switching effect and phase-change transition in chalcogenide materials. IEEE Electron Device Letters 25, 10 (2004), 684-686.

Sainio, A. Nvdimm—changes are here so what's next? In-Memory Computing Summit (2016).

Strukov, D. B., Snider, G. S., Stewart, D. R., and Williams, R. S. The missing memristor found. nature 453, 7191 (2008), 80.

Sun, G., Niu, D., Ouyang, J., and Xie, Y. A frequent-value based pram memory architecture. In Proceedings of the 16th Asia and South Pacific Design Automation Conference (2011), IEEE Press.

Volos, H., Tack, A. J., and Swift, M. M. Mnemosyne: Lightweight persistent memory. In ACM SIGARCH Computer Architecture News (2011), vol. 39, ACM.

Xilinx. 7 series fpgas data sheet. https://www.xilinx.com/support/documentation/data_sheets/ds180_7Series_Overview.pdf, 2018.

Yang, B.-D., Lee, J.-E., Kim, J.-S., Cho, J., Lee, S.-Y., and Yu, B.-G. A low power phase-change random access memory using a data-comparison write scheme. In Circuits and Systems, 2007. ISCAS 2007. IEEE International Symposium on (2007), IEEE.

Yi, J., Ha, Y., Park, J., Kuh, B., Horii, H., Kim, Y., Park, S., Hwang, Y., Lee, S., and Ahn, S. Novel cell structure of pram with thin metal layer inserted gesbte. In Electron Devices Meeting, 2003. IEDM'03 Technical Digest. IEEE International (2003), IEEE.

Yue, J., and Zhu, Y. Accelerating write by exploiting pcm asymmetries. In High Performance Computer Architecture (HPCA2013), 2013 IEEE 19th International Symposium on (2013), IEEE.

Zhou, P., Zhao, B., Yang, J., and Zhang, Y. A durable and energy efficient main memory using phase change memory technology. In International Symposium on Computer Architecture (ISCA) (2009).

\* cited by examiner

MEMORY CONTROLLING DEVICE FOR RECONSTRUCTING ORIGINAL DATA USING NON-BLOCKING CODE AND MEMORY SYSTEM INCLUDING THE SAME

CROSS-REFERENCE TO RELATED APPLICATION

This application claims priority to and the benefit of Korean Patent Application No. 10-2018-0075930 filed in the Korean Intellectual Property Office on Jun. 29, 2018, the entire contents of which are incorporated herein by reference.

BACKGROUND

(a) Field

The described technology generally relates to a memory controlling device and a memory system including the same.

(b) Description of the Related Art

Next-generation semiconductor memories are being developed to meet the demand for higher performance and lower power consumption of semiconductor memories. A phase-change memory (PCM) using a phase-change material, particularly, a phase-change random access memory (PRAM) is one of the next-generation semiconductor memories. The phase-change memory uses the phase-change material that switches between a crystalline state and an amorphous state, and stores data based on a resistivity difference between the crystalline state and the amorphous state.

The phase-change memory has a problem in which it takes a lot of time to a data write that needs to change the state of the phase-change material rather than reading the data through the phase-change material in a current state.

SUMMARY

An embodiment of the present invention provides a memory system and memory controlling device using a phase-change memory, capable of increasing a response speed.

According to an embodiment of the present invention, a memory system including a memory subsystem and a memory controller is provided. The memory subsystem includes a plurality of first memory modules implemented by a phase-change memory and a second memory module implemented by a memory whose write speed is faster than that of the phase-change memory. The memory controller is connected to the plurality of first memory modules and the second memory module via a plurality of channels. The memory controller generates a non-blocking code from a plurality of sub-data into which original data are divided, writes the non-blocking code to the second memory module, writes the plurality of sub-data to the plurality of first memory modules, respectively, and reconstructs the original data from some sub-data of the plurality of sub-data which are read from some of the plurality of first memory modules and the non-blocking code read from the second memory under a predetermined condition at a read request.

The memory controller may include a cache that stores data of a write request in accordance with the write request from a central processing unit (CPU).

In a case where the original data are stored in the cache, the memory controller, upon migrating the original data stored in the cache into the memory subsystem, may write the non-blocking code to the second memory module and write the plurality of sub-data to the plurality of first memory modules, respectively.

The plurality of sub-data may include first sub-data and second sub-data. When writing the plurality of sub-data to the plurality of first memory modules, the memory controller may write the first sub-data to a corresponding first memory module among the plurality of first memory modules, and write the second sub-data to a corresponding first memory module among the plurality of first memory modules after write of the first sub-data is completed.

The memory controller may remove the original data from the cache after the plurality of sub-data have been written to the plurality of first memory modules.

When writing the first sub-data to the corresponding first memory module, the memory controller may write the non-blocking code to the second memory module.

When a cache hit occurs for the original data while the original data are being migrated into the memory subsystem, the memory controller may stop migrating the original data.

A memory cell array of each first memory module may be partitioned into a plurality of partitions. The predetermined condition may include a condition that a write operation is being performed in a partition to which some other sub-data of the plurality of sub-data are stored.

The predetermined condition may further include a condition that a cache miss occurs for the read request of the original data.

The cache may be implemented by a non-volatile memory.

The memory system may be a main memory used by a CPU of a computing device.

According to another embodiment of the present invention, a memory controlling device connected to a memory subsystem including a first memory module and second memory module implemented by a phase-change memory and a third memory module implemented by a memory whose write speed is faster than that of the phase-change memory via a plurality of channels is provided. The memory controlling device includes a cache and a memory controller. The cache stores data of a write request in accordance with the write request from a CPU. The memory controller divides original data stored in the cache into a plurality of sub-data including first sub-data and second sub-data, and generates a non-blocking code from the plurality of sub-data. The memory controller writes the first sub-data to the first memory module, writes the second sub-data to the second memory module, and writes the non-blocking code to the third memory module, at migration. The memory controller reconstructs the original data from the first sub-data read from the first memory module and the non-blocking code read from the third memory module without reading the second sub-data from the second memory module, under a predetermined condition at a read request from the CPU.

The memory controller may write one sub-data of the first and second sub-data to a corresponding memory module of the first and second memory modules, and write other sub-data of the first and second sub-data to a corresponding memory module of the first and second memory modules after write of the one sub-data is completed.

The memory controller may remove the original data from the cache after the first and second sub-data have been written to the first and second memory modules.

The memory controller may write the non-blocking code to the third memory module when writing the one sub-data to the corresponding memory module.

When a cache hit occurs for the original data during the migration, the memory controller may stop migrating the original data.

A memory cell array of the second memory module may be partitioned into a plurality of partitions. In this case, the predetermined condition may include a condition that a write operation is being performed in a partition in which the second sub-data are stored.

The predetermined condition may further include a condition that a cache miss occurs for the read request of the original data.

The cache may be implemented by a non-volatile memory.

According to yet another embodiment of the present invention, a memory system including the above-described memory controlling device and memory subsystem is provided.

According to still another embodiment of the present invention, a memory system including a memory subsystem and a memory controller is provided. The memory subsystem includes a plurality of first memory modules implemented by a first type of memory and a second memory module implemented by a second type of memory whose write speed is faster than that of the first type of memory. The memory controller is connected to the plurality of first memory modules and the second memory module via a plurality of channels. The memory controller generates a non-blocking code from a plurality of sub-data into which original data are divided, writes the non-blocking code to the second memory module, writes the plurality of sub-data to the plurality of first memory modules, respectively, and reconstructs the original data from some sub-data of the plurality of sub-data which are read from some of the plurality of first memory modules and the non-blocking code read from the second memory without reading the sub-data from remaining some of the plurality of first memory modules under a predetermined condition at a read request.

According to further embodiment of the present invention, a memory controlling device connected to a memory subsystem including a first memory module and second memory module implemented by a first type of memory and a third memory module implemented by a second type of memory whose write speed is faster than that of the first type of memory via a plurality of channels is provided. The memory controlling device includes a cache and a memory controller. The cache stores data of a write request in accordance with the write request from a CPU. The memory controller divides original data stored in the cache into a plurality of sub-data including first sub-data and second sub-data, and generates a non-blocking code from the plurality of sub-data. The memory controller writes the first sub-data to the first memory module, writes the second sub-data to the second memory module, and writes the non-blocking code to the third memory module, at migration. The memory controller reconstructs the original data from the first sub-data read from the first memory module and the non-blocking code read from the third memory module without reading the second sub-data from the second memory module, under a predetermined condition at a read request from the CPU.

According to an embodiment of the present invention, long write latency in the phase-change memory can be hidden, and data of a read request can be served without blocking the read request. According to another embodiment, memory persistency can be provided without a logging mechanism for storing log data.

DETAILED DESCRIPTION OF THE EMBODIMENTS

Figure 1:
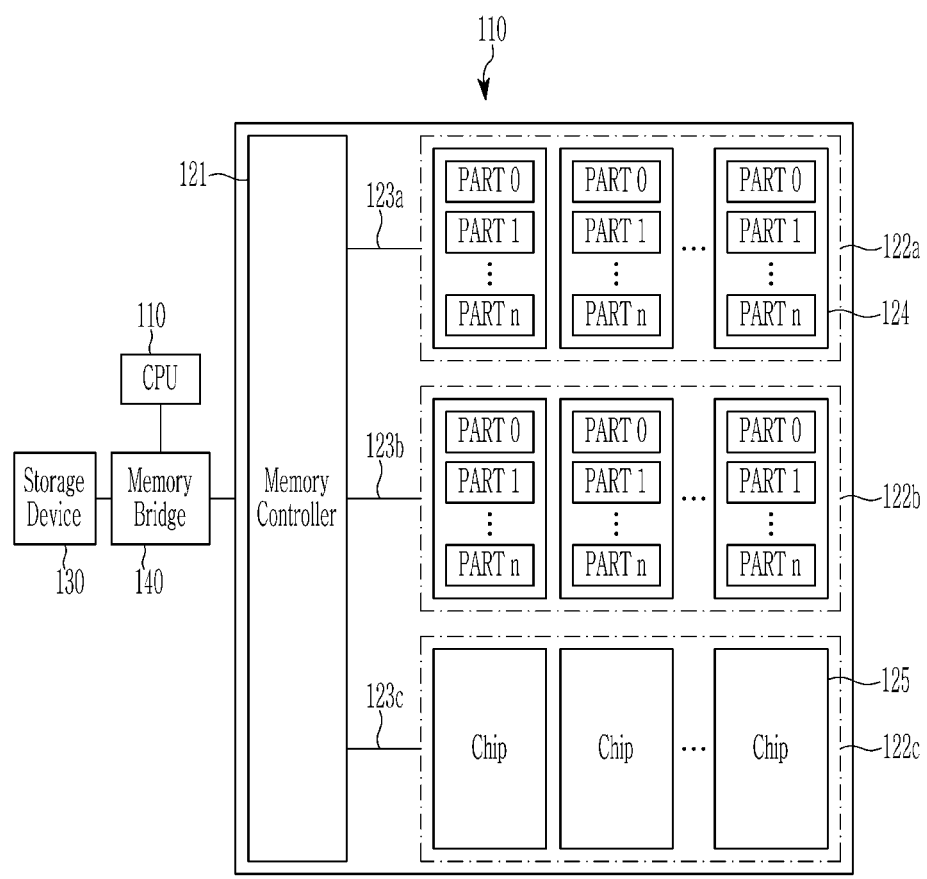
FIG. 1 is a schematic block diagram of a computing device according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic block diagram of a computing device according to an embodiment of the present invention. FIG. 1 shows an example of a possible computing device, and a computing device according to an embodiment of the present invention may be implemented by various structures.

Referring to FIG. 1, a computing device 100 according to an embodiment of the present invention includes a central processing unit (CPU) 110 and a memory 120.

The memory 120 is accessed and used by the CPU 110. In some embodiments, the memory 120 may be a main memory of the computing device. In this case, the memory 120 may be a byte-addressable memory.

In some embodiments, the computing device 100 may further include a storage device 130.

In some embodiments, the computing device 100 may further include a memory bridge for connecting the memory 120 and the storage device 130 with the CPU 110. The memory bridge 140 may be, for example, a northbridge or a memory controller hub (MCH).

Referring to FIG. 1 again, a memory system 120 used as the memory 120 includes a memory controller 121 and a memory subsystem 122, and the memory subsystem 122 is connected to the memory controller 121 via a plurality of channels 123a, 123b, and 123c. The memory controller 121 receives a request, for example, an input/output (I/O) request from the CPU 110, and accesses the memory subsystem 122 based on the received I/O request.

The memory subsystem 122 includes a plurality of phase-change memory (PCM) modules 122a and 122b and a non-blocking memory module 122c. Hereinafter, a phase-change random access memory (PRAM) is described as an example of the PCM. Further, a memory whose write speed is faster than that of the PRAM is used as the non-blocking memory module 122c. Hereinafter, it is described that a dynamic random access memory (DRAM) module is used as the non-blocking memory module 122c.

The PRAM modules 122a and 122b are provided as spaces for storing data. Each of the PRAM modules 122a and 122b is connected to the memory controller 121 via a corresponding channel 123a or 123b, i.e., a PRAM channel 123a or 123b. The DRAM module 122c is provided as a space for storing a non-blocking code. The DRAM module 122c is connected to the memory controller 121 via a corresponding channel 123c, i.e., a DRAM channel 123c. The non-blocking code is a code that can be used to reconstruct original data together with remaining data even if some data are omitted from the original data.

The memory controller 121 divides write data to be written to the memory subsystem 122 according to the I/O request into a plurality of sub-data, and generates the non-blocking code based on the plurality of sub-data. The memory controller 121 writes the plurality of sub-data to the plurality of PRAM modules 122a and 122b, respectively, via the plurality of PRAM channels 123a and 123b, and writes the non-blocking code to the DRAM module 122c via the DRAM channel 123c. When a read operation cannot be performed in a certain PRAM module among the plurality of PRAM modules 122a and 122b to which the write data are divided and written, the memory controller 110 can read sub-data from a PRAM module that can perform the read operation among the plurality of PRAM modules 122a and 122b and read the non-blocking code from the DRAM module 122c, and then reconstruct the original write data from the read sub-data and non-blocking code.

As shown in FIG. 1, when the two PRAM modules 122a and 122b are used, the memory controller 121 may divide the write data into two sub-data. For example, when the write data is 64-byte data, the memory controller 121 may divide the write data into two 32-byte sub-data and write the two 32-byte sub-data into the two PRAM module 122a and 122b, respectively. The memory controller 121 may generate the non-blocking code by coding the two sub-data and write the non-blocking code to the DRAM module 122c. Further, the memory controller 121 may read the sub-data from one PRAM module in the two PRAM modules 122a and 122b and read the non-blocking code from the DRAM module 122c, and then reconstruct the original write data by combining the sub-data and the non-blocking code.

While an example in which the two PRAM modules 122a and 122b and the two PRAM channels 123a and 123b corresponding to the two PRAM modules 122a and 122b are used has been shown in FIG. 1, the number of PRAM modules is not limited to two and may be two or more. Further, while an example in which the original data are divided into two sub-data has been described with reference to FIG. 1, the number of sub-data into which the original data are divided is not limited to two and may be divided into two or more sub-data.

For example, the original data may be divided into four sub-data (data A, data B, data C, and data D). In this case, the memory subsystem 122 may include at least four PRAM modules (PRAM module A, PRAM module B, PRAM module C, and PRAM module D), and the data A, data B, data C, and data D may be stored to the PRAM module A, PRAM module B, PRAM module C, and PRAM module D, respectively.

In one example, the memory controller 121 may generate one non-blocking code by coding the data A, data B, data C, and data D, and store the non-blocking code to the DRAM module. In this case, even if the memory controller 121 does not read the data A from one PRAM module (e.g., PRAM module A), the memory controller 121 can reconstruct the original data from the three data (data B, data C, and data D) read from the remaining three PRAM modules (e.g., PRAM module B, PRAM module C, and PRAM module D) and the non-blocking code read from the DRAM module.

In another example, the memory controller 121 may generate one non-blocking code by coding data into which the data A and data B are combined and data into which the data C and data D are combined, and store the non-blocking code to the DRAM module. In this case, even if the memory controller 121 does not read the data A and data B from two PRAM modules (e.g., PRAM module A and PRAM module B), the memory controller 121 can reconstruct the original data from the two data (data C and data D) read from the remaining two PRAM modules (e.g., PRAM module C and PRAM module D) and the non-blocking code read from the DRAM module.

In yet another example, the memory controller 121 may generate one non-blocking code by coding the data A and data B and store the one non-blocking code to the DRAM module, and may generate the other non-blocking code by coding the data C and data D and store the other non-blocking code to the DRAM module. In this case, the two non-blocking codes may be stored to different DRAM modules. In this case, even if the memory controller 121 does not read the data A and data C from two PRAM modules (e.g., PRAM module A and PRAM module C), the memory controller 121 can reconstruct the original data from two data (data B and data D) read from the remaining two PRAM modules (e.g., PRAM module B and PRAM module D) and the two non-blocking codes read from the DRAM module.

Referring to FIG. 1 again, the PRAM module 122a or 122b connected to one channel includes a plurality of PRAM chips (or PRAM banks) 124. In some embodiments, each PRAM chip (or PRAM bank) may be partitioned into a plurality of partitions PART0-PARTn. The PRAM module 122a or 122b connected to one channel may be formed as one rank, or may be extended to a plurality of ranks. In some embodiments, if a plurality of ranks connected to one channel can operate independently, each rank may operate as an independent PRAM module. In this case, a plurality of PRAM modules (i.e., a plurality of ranks) may share one channel. The DRAM module 122c connected to one channel includes a plurality of DRAM chips (or DRAM banks). The DRAM module 122c connected to one channel may be formed as one rank, or may be extended to a plurality of ranks.

Next, an example of a PRAM 120 included in a memory system 100 according to an embodiment of the present invention is described.

Figure 2:
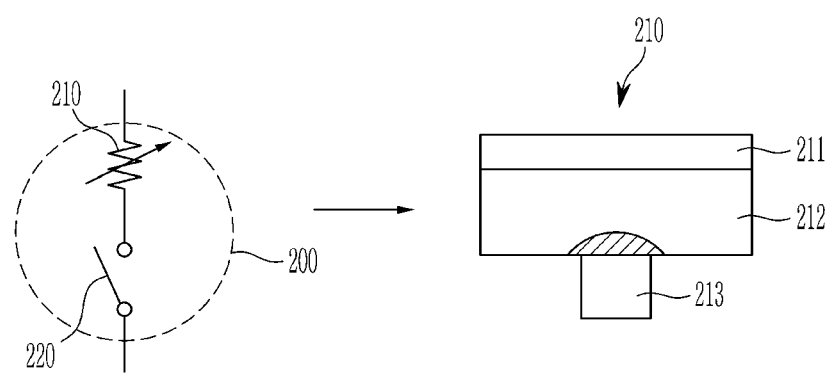
FIG. 2 schematically shows one memory cell in a PRAM.
Figure 3:
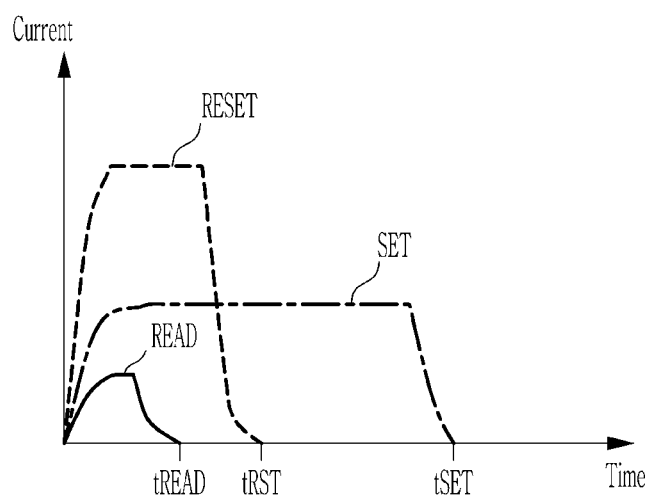
FIG. 3 shows a current applied to a memory cell shown in FIG. 2.
Figure 4:
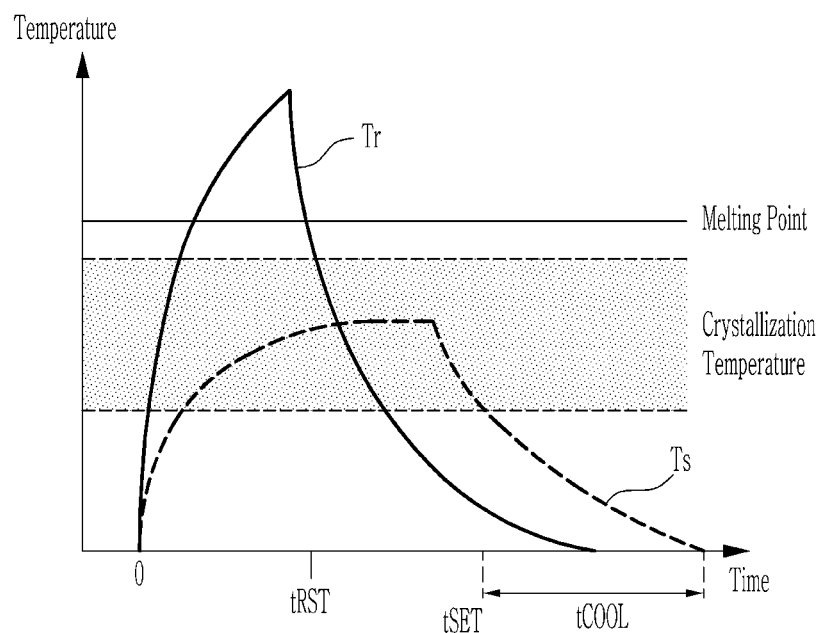
FIG. 4 shows a temperature change when a current shown in FIG. 3 is applied to a memory cell shown in FIG. 2.

FIG. 2 schematically shows one memory cell in a PRAM, FIG. 3 shows a current applied to a memory cell shown in FIG. 2, and FIG. 4 shows a temperature change when a current shown in FIG. 3 is applied to a memory cell shown in FIG. 2.

The memory cell shown in FIG. 2 is an example memory cell, and a memory cell of the PRAM according to embodiments of the present invention may be implemented in various forms.

Referring to FIG. 2, a memory cell 200 of a PRAM includes a phase-change element 210 and a switching element 220. The switching element 220 may be implemented with various elements such as a transistor or a diode. The phase-change element 210 includes a phase-change layer 211, an upper electrode 212 formed above the phase-change layer 211, and a lower electrode 213 formed below the phase-change layer 211. For example, the phase-change layer 210 may include an alloy of germanium (Ge), antimony (Sb) and tellurium (Te), which is referred to commonly as a GST alloy, as a phase-change material.

The phase-change material can be switched between an amorphous state with relatively high resistivity and a crystalline state with relatively low resistivity. A state of the phase-change material may be determined by a heating temperature and a heating time.

Referring to FIG. 2 again, when a current is applied to the memory cell 200, the applied current flows through the lower electrode 213. When the current is applied to the memory cell 200 during a short time, a portion, of the phase-change layer 211, adjacent to the lower electrode 213 is heated by the current. The portion (the cross-hatched portion in FIG. 2) of the phase-change layer 211 is switched to one of the crystalline state and the amorphous state in accordance with the heating profile of the current. The crystalline state is called a set state and the amorphous state is called a reset state.

Referring to FIG. 3 and FIG. 4, the phase-change layer 211 is programmed to the reset state when a reset pulse RESET with a high current is applied to the memory cell 200 during a short time tRST. If a temperature Tr of the phase-change material reaches a melting point as the phase-change material of the phase-change layer 211 is heated by the applied reset pulse RESET, the phase-change material is melted and then is switched to the amorphous state. The phase-change layer 211 is programmed to the set state when a set pulse SET having a lower current than the reset pulse RESET is applied to the memory cell 200 during a time tSET being longer than the time tRST. If a temperature Ts of the phase-change material reaches a crystallization temperature lower than the melting point as the phase-change material is heated by the applied set current SET, the phase-change material is transformed to the crystalline state. Since the reset state and the set state can be maintained when a pulse is applied with a lower current than the set pulse SET or during the shorter time than the set pulse SET, data can be programmed to the memory cell 200.

The reset state and the set state may be set to data of "1" and "0," respectively, and the data may be sensed by measuring the resistivity of the phase-change element 210 in the memory cell 200. Alternatively, the reset state and the set state may be set to data of "0" and "1," respectively.

Therefore, the data stored in the memory cell 200 can be read by applying a read pulse READ to the memory cell 200. The read pulse READ is applied with a low current during a very short time tREAD such that the state of the memory cell 200 is not changed. The current of the read pulse READ may be lower than the current of the set pulse SET, and the applied time of the read pulse READ may be shorter than the applied time tRST of the reset pulse RESET. Because the resistivity of the phase-change element 210 in the memory cell 200 is different according to the state of the phase-change element 210, the state of the memory cell 200, i.e., the data stored in the memory cell 200, can be read by a magnitude of a current flowing to the phase-change element 210 or a voltage drop on the phase-change element 210.

In one embodiment, the state of the memory cell 200 may be read by a voltage at the memory cell 200 when the read pulse READ is applied. In this case, since the phase-change element 210 of the memory cell 200 has a relatively high resistance in the reset state, the state may be determined to the reset state in a case that the voltage sensed at the phase-change element 210 is relatively high and to the set state in a case that the voltage sensed at the phase-change element 210 is relatively low. In another embodiment, the state of the memory cell 200 may be read by an output current when a voltage is applied to the memory cell 200. In this case, the state may be determined to the reset state in a case that the current sensed at the phase-change element 210 is relatively low and to the set state in a case that the current sensed at the phase-change element 210 is relatively high.

As writing data is practically a sequence of reset and set processes in the PRAM, a write operation is much slower than a read operation by the reset pulse having the longer applied time.

Figure 5:
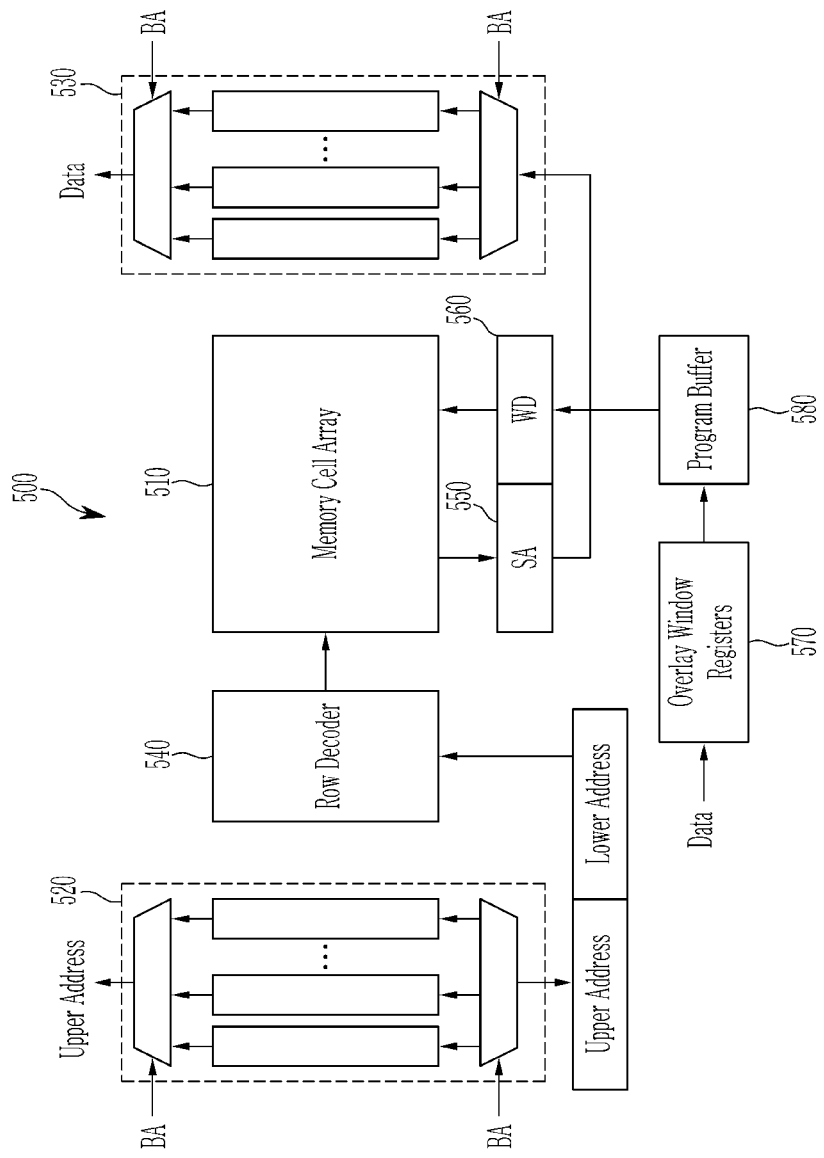
FIG. 5 is a schematic block diagram showing a PRAM in a memory controlling device according to an embodiment of the present invention.

FIG. 5 is a schematic block diagram showing a PRAM in a memory controlling device according to an embodiment of the present invention. A PRAM shown in FIG. 5 may be a PRAM chip or a PRAM bank.

Referring to FIG. 5, a PRAM 500 includes a memory cell array 510, a row address buffer 520, a row data buffer 530, a row decoder 540, a sense amplifier 550, and a write driver 560.

The memory cell array 510 includes a plurality of word lines (not shown) extending substantially in a row direction, a plurality of bit lines (not shown) extending substantially in a column direction, and a plurality of memory cells (not shown) that are connected to the word lines and the bit lines and are formed in a substantially matrix format. The memory cell may be, for example, a memory cell 200 described with reference to FIG. 2.

Both the row address buffer 520 and the row data buffer 530 form a row buffer.

Each row buffer is logically paired by the row address buffer 520 and the row data buffer 530, and is selected by a buffer address.

The row address buffer 520 stores commands and addresses (particularly, row addresses) from a memory controller (not shown). The row data buffer 530 stores data from the memory cell array 510.

In some embodiments, the PRAM 500 may employ a non-volatile memory (NVM) interface to use the plurality of row buffers 520 and 530. In one embodiment, the non-volatile memory interface may be a double data rate (DDR) interface, for example, LPDDR2-NVM (low-power double data rate 2 non-volatile memory) interface. The row address buffer 520 receives a row address and a bank address via the NVM interface, and the row data buffer 530 outputs data via the NVM interface.

The row decoder 540 decodes a row address to select a target row from among the plurality of rows in the memory cell array 510. That is, the row decoder 540 selects a target word line for reading data or writing data from among the plurality of word lines of the memory cell array 510.

In some embodiments, the row address transferred from the memory controller may be divided into an upper address and a lower address. In this case, the upper address may be delivered to the row address buffer 520, and the lower address may be directly delivered to the row decoder 540. The row decoder 540 may combine the upper address accommodated in the row address buffer 520 with the directly delivered lower address to select the target row.

The sense amplifier 550 reads data stored in the memory cell array 510. The sense amplifier 550 may read the data, through a plurality of bit lines, from a plurality of memory cells connected to the word line selected by the row decoder 540. The write driver 560 writes the input data to the memory cell array 510. The write driver 560 may write the data, through a plurality of bit lines, to a plurality of memory cells connected to the word line selected by the row decoder 540.

In some embodiments, to address the issue that the write operation is slower than the read operation, the PRAM 500 may first store the input data to a buffer and then write the stored data to the memory cell array 510. For this, the PRAM 500 may include an overlay window 570 and 580 as memory-mapped registers. The overlay window may include overlay window registers 570 and a program buffer 580. In one embodiment, information on write data (for example, the first data address and the number of bytes to be programmed) may be written to the registers 570 and then the write data may be stored to the program buffer 580. Next, when a predetermined value is written to the overlay window registers 570, the data stored to the program buffer 580 may be written to the memory cell array 510. In this case, the memory controller may determine whether the write operation is completed by polling the overlay window registers 570.

Figure 6:
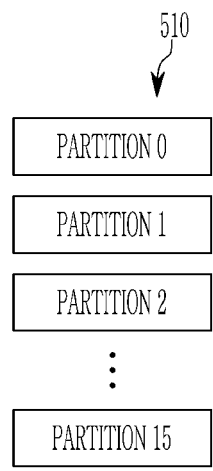
FIG. 6 shows an example of a partitioning scheme in a memory cell array of a PRAM module according to an embodiment of the present invention.
Figure 7:
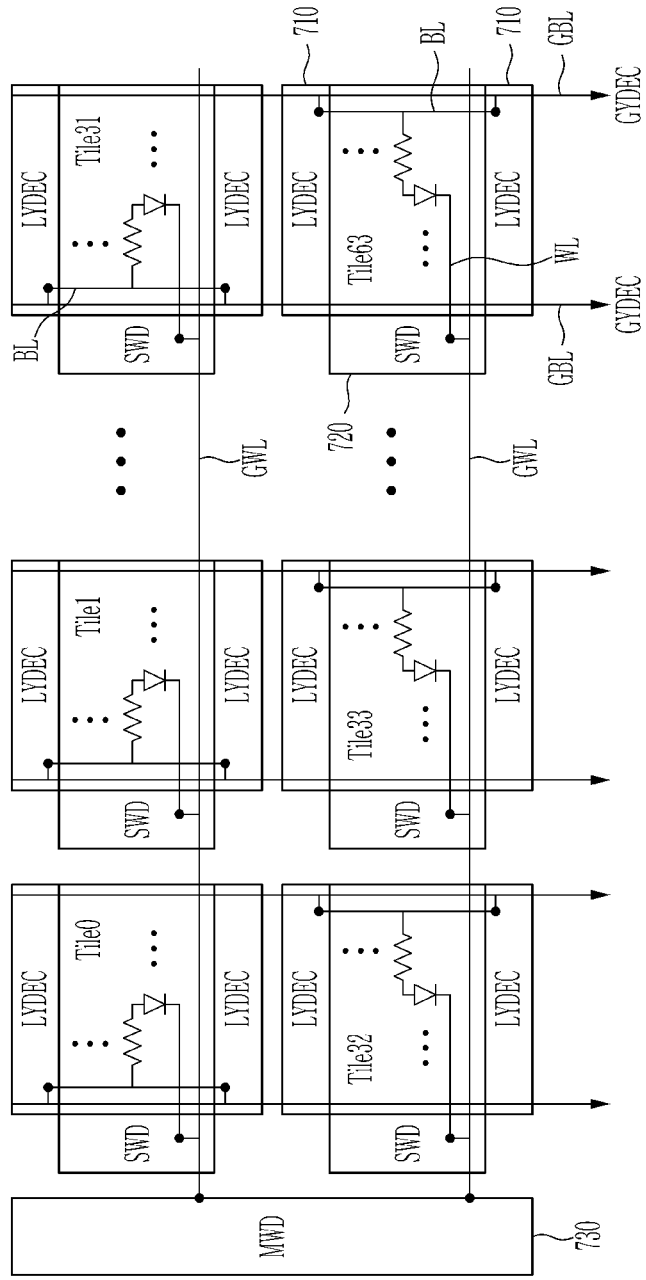
FIG. 7 shows an example of a partition in a PRAM module according to an embodiment of the present invention.

FIG. 6 shows an example of a partitioning scheme in a memory cell array of a PRAM module according to an embodiment of the present invention, and FIG. 7 shows an example of a partition in a PRAM module according to an embodiment of the present invention.

Referring to FIG. 6, in some embodiments, a memory cell array 510, for example, a PRAM bank may be partitioned into a plurality of partitions PART0 to PART15. It is shown in FIG. 6 that the memory cell array 510 is partitioned into sixteen partitions PART0 to PART15. A plurality of row buffers 520 and 530 may be connected to the partitions PART0 to PART15. For example, each partition may perform 128-bit parallel I/O processing.

In some embodiments, a plurality of partitions PART0-PART15 may share a reading circuit such as a sense amplifier (550 of FIG. 5).

Referring to FIG. 7, in some embodiments, each partition may include a plurality of sub-arrays which are referred to as resistive tiles. It is shown in FIG. 7 that one partition includes 64 tiles Tile® to Tile63.

Each tile includes a plurality of memory cells, i.e., PRAM cores connected to a plurality of bit lines (e.g., 2048 bit lines) and a plurality of word lines (e.g., 4096 word lines). For convenience, one memory cell among the plurality of memory cells, and one bit line BL and one word line WL connected to the one memory cell are shown in FIG. 7. Further, a phase-change element and a switching element forming the memory cell are shown as a resister and a diode, respectively.

A local column decoder (hereinafter referred to as an "LYDEC") 710 may be connected to each tile. The LYDEC 710 is connected to the plurality of bit lines BL of a corresponding tile. Further, a plurality of global bit lines GBL, which correspond to the plurality of tiles respectively, may be formed in the partition. Each global bit line GBL may be connected to the plurality of bit lines BL of the corresponding tile and to a global column decoder (hereinafter referred to as a "GYDEC"). In some embodiments, the LYDEC 710 together with the GYDEC may be used to select bit lines BL in the corresponding tile of the corresponding partition. A sense amplifier (550 of FIG. 5) may read data through the selected bit lines BL or a write driver (570 of FIG. 5) may write data through the selected bit lines BL.

A sub-word line driver (hereinafter referred to as an "SWD") 720 may be connected to each tile to maximize the degree of parallelism. A global word line GWL may be formed in the partition and may be connected to a main word line driver (hereinafter referred to as an "MWD") 730. In this case, a plurality of word lines WL formed in the partition may be connected to the global word line GWL. All the SWDs within the partition are connected to the MWD 730. In some embodiments, the SWD 720 together with the MWD 730 may be used to drive a word line WL in the corresponding tile. The driven word line WL may be selected by a row decoder (540 of FIG. 5).

When the partition structure shown in FIG. 6 and FIG. 7 is used, a plurality of I/O operations (e.g., 64 I/O operations in an example of FIG. 7) per partition can be simultaneously performed. Further, since the local decoder and the word line driver in each partition as shown in FIG. 6 and FIG. 7, the memory system can access different partitions in parallel. However, the different partitions can support simultaneous I/O services only if the type of incoming I/O requests is different.

For example, while a write operation is being performed in partition 0 of the PRAM, a read service can be provided in a partition other than the partition 0, for example, partition 1. Because the read and write can be served in the different partitions in parallel, another read operation can be performed during the slow write operation. Accordingly, many read requests can be served in parallel during write latency, without waiting for the write operation to complete.

However, while the write operation is being performed in the partition 0 of the PRAM, the read service cannot be provided in the partition 0. Therefore, after the write operation is completed in the partition 0, the read operation can be performed in the partition 0. In this case, a response time of the read request (i.e., a time required for the read operation to complete) may correspond to a sum of write latency and read latency. Embodiments for preventing the response time of the read request from taking a long time are described.

A memory system according to an embodiment of the present invention is described with reference to FIG. 8.

Figure 8:
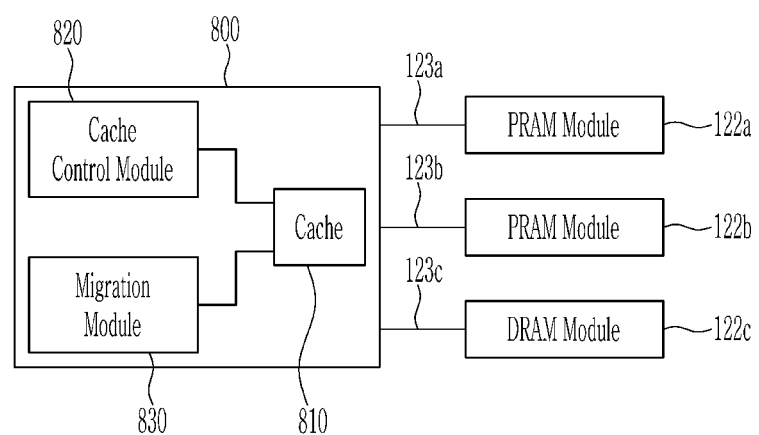
FIG. 8 is a schematic block diagram of a memory system according to an embodiment of the present invention.

FIG. 8 is a schematic block diagram of a memory system according to an embodiment of the present invention.

Referring to FIG. 8, a memory system according to an embodiment of the present invention includes a memory controller 800 and a memory subsystem.

As described with reference to FIG. 1, the memory controller 800 is connected to the memory subsystem including PRAM modules 122*a* and 122*b* and a DRAM module 122*c* via a plurality of channels 123*a*, 123*b*, and 123*c*, and includes a cache 810, a cache control module 820, and a migration module 830.

The memory subsystem 122 includes the PRAM modules 122*a* and 122*b* which are connected to the memory controller 800 via the PRAM channels 123*a* and 123*b*, respectively, and the DRAM module 122*c* which is connected to the memory controller 800 via the DRAM channel 123*c*. Hereinafter, for convenience, an example in which the two PRAM channels 123a and 123b, i.e., the PRAM modules 122a and 122b are used is described. However, the present invention is not limited thereto.

The cache 810 stores original data from a CPU when a write request is received from the CPU, and further stores cache information. In some embodiments, the cache 810 may divide the original data into a plurality of sub-data DATA_A and DATA_B, and store them. The cache 810 uses a memory whose write speed is faster than that of a PRAM, for example, a DRAM or a magnetoresistive random access memory (MRAM). Accordingly, write latency due to the PRAM in the memory system can be hidden from the CPU.

The migration module 830 generates a non-blocking code from the sub-data DATA_A and DATA_B stored in the cache 810. The migration module 830 writes the sub-data DATA_A and DATA_B to the PRAM modules 122a and 122b via the corresponding PRAM channels 123a and 123b, respectively, and writes the non-blocking code to the DRAM module 122c via the DRAM channel 123c, thereby migrating the data of the cache 810 into the memory subsystem 123. In some embodiments, the migration may be performed during an idle time of the memory controller 800.

In one embodiment, an exclusive OR (XOR) operation may be used as a coding scheme for generating the non-blocking code. In this case, when 64-byte original data are divided into two 32-byte sub-data DATA_A and DATA_B, a bitwise XOR operation is performed on the 32-byte sub-data DATA_A and DATA_B so that a 32-byte non-blocking code can be generated. For example, when original data of "001011100110" are divided into DATA_A of "001011" and DATA_B of "100110", the non-blocking code can result in "101101". The DATA_B of "100110" can be reconstructed by the XOR operation on the DATA_A and the non-blocking code, or the DATA_A of "001011" can be reconstructed by the XOR operation on the DATA_B and the non-blocking code.

In another embodiment, coding schemes other than the XOR operation may be used to generate the non-blocking code. When the other coding schemes are used, a size of the non-blocking code can be reduced compared with the XOR operation.

In an example, an error correction coding (ECC) may be used as a coding scheme for generating the non-blocking code. For example, a parity code may be generated as the non-blocking code by low density parity check (LDPC) coding.

In another example, erasure coding may be used as a coding scheme for generating the non-blocking code. In the erasure coding, the original data may be divided into n data chunks, and k coded chunks may be generated from the n data chunks by using an erasure coding algorithm. The original data can be reconstructed from n chunks by using coded chunks as many as the number of unusable data chunks.

In yet another embodiment, a coding scheme provided for error correction in a typical PRAM module and its memory controller may be used.

When the memory controller 800 receives a read request from the CPU, the cache control module 820 determines whether the read request hits or misses in cache by referring to a lookup table. When the read request is the cache hit, the cache control module 820 reads data from the cache 810. When the read request is the cache miss, the memory controller 800 reads data from the memory subsystem 820. In this case, a case in which sub-data cannot be read from any one PRAM module of the two PRAM modules 122a and 122b may occur. For example, when a write operation is being performed in the same partition as a partition to which the sub-data DATA_B are stored in the PRAM module 122b (i.e., a partition conflict occurs), the sub-data DATA_B cannot be read from the PRAM module 122b. In this case, the memory controller 800 reads the sub-data DATA_A from the PRAM module 122a and reads the non-blocking code from the DRAM module 122c. The cache control module 820 of the memory controller 800 then reconstructs the original data from the non-blocking code and the sub-data DATA_A. For example, when the XOR operation is used as the coding scheme for generating the non-blocking code, the cache control module 820 may perform the XOR operation on the sub-data DATA_A and the non-blocking code to reconstruct the original data.

As described above, according to an embodiment of the present invention, in a case where data are read from the memory subsystem due to the cache miss, even if data cannot be directly read from the PRAM module due to the partition conflict or the like, the read data can be served by using the non-blocking code, without waiting for the write operation to complete.

Figure 9:
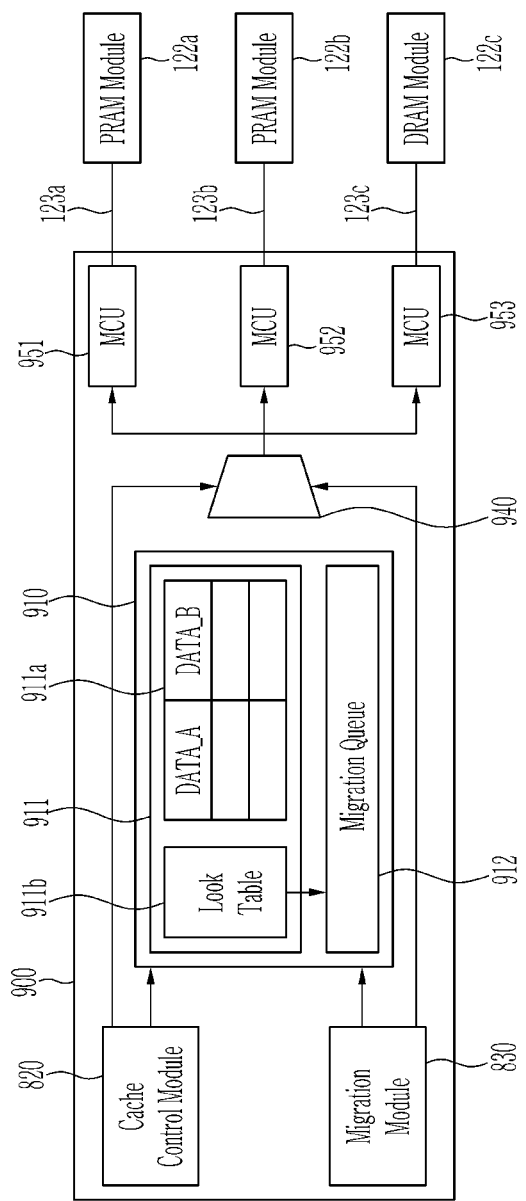
FIG. 9 is a schematic block diagram of a memory system according to another embodiment of the present invention.

FIG. 9 is a schematic block diagram of a memory system according to another embodiment of the present invention.

Referring to FIG. 9, a memory controller 900 includes a lookup module 910, a cache control module 820, and a migration module 830, and the lookup module 910 includes a cache 911 and a migration queue 912.

The cache 911 may store a lookup table 911b besides original data 911a. In some embodiments, the lookup table 911b may include a plurality of entries corresponding to cache indices, and each entry may indicate a cache entry (e.g., a cache line) in a storage space of the cache 911. An I/O request received from a CPU may be split into at least a tag and a cache index. The tag and cache index may be determined by a size of the cache 911. For example, when 512K cache indices are used, an address (e.g., 32 bits) of the I/O request may be split into a 19-bit cache index and 3-bit tag besides an offset (e.g., 5 bits). In this case, the lookup table 911b may have 512K entries to correspond to the 19-bit cache index, i.e., 512K cache indices. In one embodiment, each entry may include a tag array, a counter, and a valid bit. The tag array may store a tag of an address of an I/O request, and the valid bit may indicate whether data exist in a corresponding cache entry. The counter may be updated according to an access to a corresponding cache entry.

The migration queue 912 stores information of a cache entry which is needed to be migrated. The migration queue 912 may be implemented by a memory whose write speed is faster than that of a PRAM, for example, a DRAM or an MRAM.

The cache control module 820 may transfer a lookup instruction to the lookup module 910 to determine whether an I/O request is a cache hit or cache miss. It may be determined whether the I/O request is the cache hit or cache miss, based on an address of the I/O request and the lookup table 911b of the lookup module 910

In a case of the cache miss, the cache control module 820 may transfer a find instruction to the lookup module 910 to find whether an empty cache entry exists. It may be determined whether the empty cache entry exists, based on the lookup table 911b of the lookup module 910. The cache control module 820 may transfer an update instruction to the lookup module 910 to update the lookup table 911b. Accordingly, in a case of the cache hit, the counter of the lookup table 911b corresponding to a cache entry of the cache hit may be updated. In a case of the cache miss, a new entry is added to the lookup table 911b and its counter may be updated.

In order to start migration, the migration module 830 may transfer a read instruction to the lookup module 910 to read information (i.e., head information) pointed by a head in the migration queue 912. Then, the lookup module 910 may read the head information from the migration queue 912, and migration of data stored in the cache entry corresponding to the head information may start. The migration module 830 may transfer a remove instruction to the lookup module 910 to remove the data whose migration has been completed from the cache entry. Then, the lookup module 910 may remove a queue entry corresponding to the head from the migration queue 912, moves the head to a next queue entry, and remove the data from the corresponding cache entry. When a new entry is added (that is, new data are stored in a cache entry), the lookup module 910 may insert newly inputted information of the cache entry to the migration queue 912 through an insert instruction.

The memory controller 900 may further include memory control units (MCUs) 951, 952, and 953 for controlling the PRAM modules 122a and 122b and DRAM module 122c, respectively. The memory controller 900 may further include a multiplexer 940 for transferring a memory request according to read/write from the cache control module 820 or a memory request according to migration from the migration module 830 to the MCUs 951, 952, and 953.

Figure 10:
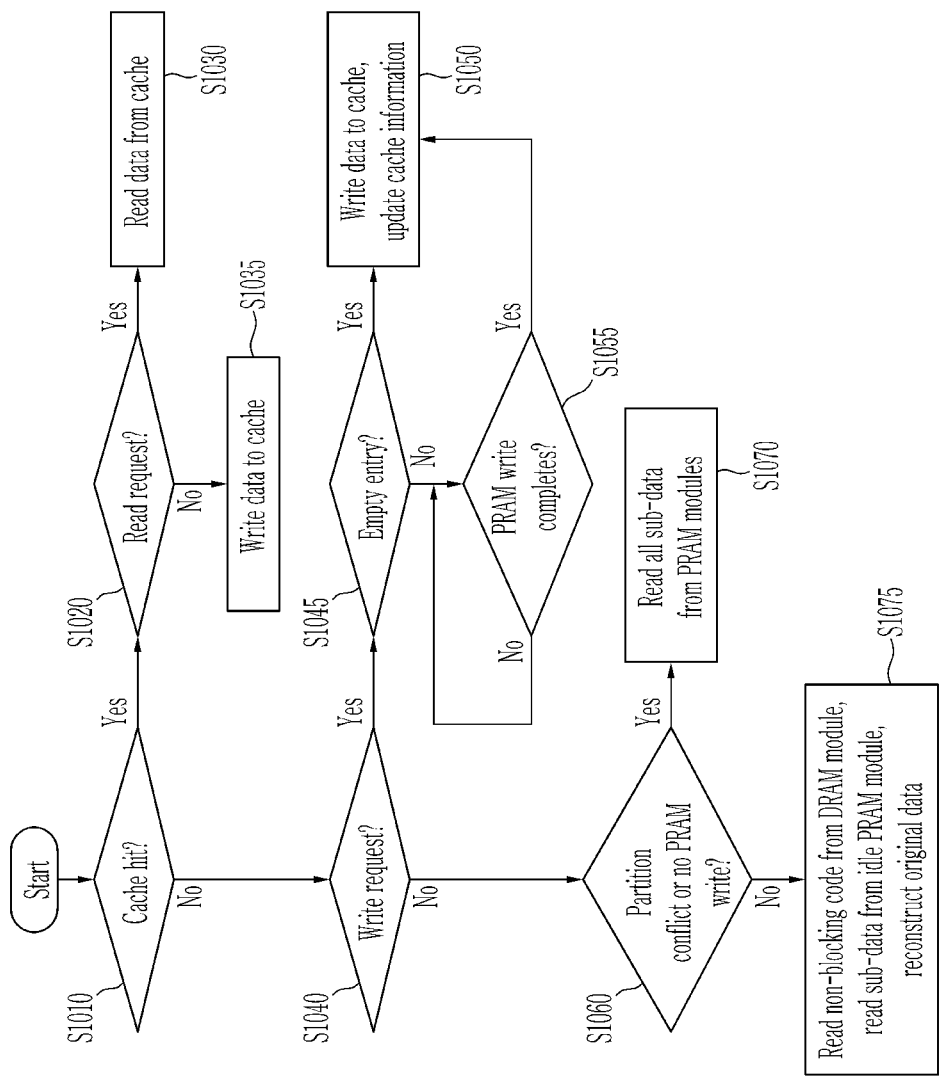
FIG. 10 is a flowchart showing operations of a cache control module in a memory controller according to an embodiment of the present invention.

FIG. 10 is a flowchart showing operations of a cache control module in a memory controller according to an embodiment of the present invention.

Referring to FIG. 10, a cache control module (820 of FIG. 8 or FIG. 9) refers to cache information of a cache (810 of FIG. 8 or 911 of FIG. 9) to determine whether a request from a CPU is a cache hit or cache miss (S1010). In a case of the cache hit (YES in S1010), the cache control module 820 provides a corresponding service through the cache (S1020, S1030, and S1035). When the request is a read request (YES in S1020), the cache control module 820 reads data of the read request from the cache 810 or 911 (S1030). When the read is a write request (NO in S1020), the cache control module 820 writes data of the write request to the cache 810 or 911 (S1035). In some embodiments, the cache control module 820 may update the cache information in accordance with the cache hit (S1050).

In a case of the cache miss (NO in S1010), when the request is a write request (YES in S1040), the cache control module 820 refers to the cache information to determine when there is an empty entry (i.e., empty cache line) in the cache 810 or 911 (S1045). When there is the empty entry in the cache 810 or 911 (YES in S1045), the cache control module 820 write data of the write request to the cache 810 or 911 (i.e., the empty entry of the cache) (S1050). In some embodiments, the cache control module 820 may update the cache information by adding information on the entry to which the data are written to the cache information (S1050). When there is no empty entry in the cache 810 or 911, since date are being written (i.e., migrated) from the cache 810 or 911 to a PRAM module of a memory subsystem (122 of FIG. 8), the cache control module 820 waits until the write to the PRAM module is completed (NO in S1055). After the write to the PRAM module is completed so that an empty entry creates in the cache 810 or 911 (YES in S1055), the cache control module 820 writes the data of the write request to the empty entry of the cache 810 or 911 (S1050).

In a case of the cache miss, when the request is the read request (NO in S1040), the cache control module 820 determines whether the memory subsystem 122 is currently under a condition that all sub-data corresponding to the original data can be read from PRAM modules (122a and 122b of FIG. 8 or FIG. 9) (S1060). In some embodiments, when write is not being performed in all of the PRAM modules 122a and 122b, the memory subsystem 122 can read all sub-data corresponding to the original data from the PRAM modules 122a and 122b. Alternatively, even if the write is being performed in any of the PRAM modules 122a and 122b, the memory subsystem 122 can read all sub-data corresponding to the original data from the PRAM modules 122a and 122b when a partition in which the write is being performed does not conflict with a partition from which the sub-data are to be read.

If the memory subsystem 122 can read all sub-data corresponding to the original data from the PRAM modules 122a and 122b (YES in S1060), the cache control module 820 reads the sub-data from the PRAM modules 122a and 122b through PRAM channels (123a and 123b of FIG. 8 or FIG. 9), and delivers the sub-data, i.e., the original data to the CPU (S1070). If the memory subsystem 122 cannot read the sub-data from any of the PRAM modules 122a and 122b (NO in S1060), the cache control module 820 reads the sub-data from the PRAM module 122a in which data read can be performed, and reads a non-blocking code from a DRAM module (122c of FIG. 8 or FIG. 9) through a DRAM channel (123c of FIG. 8 or FIG. 9) (S1075). The cache control module 820 reconstructs the original data from the sub-data and the non-blocking code and delivers the original data to the CPU (S1075).

Figure 11:
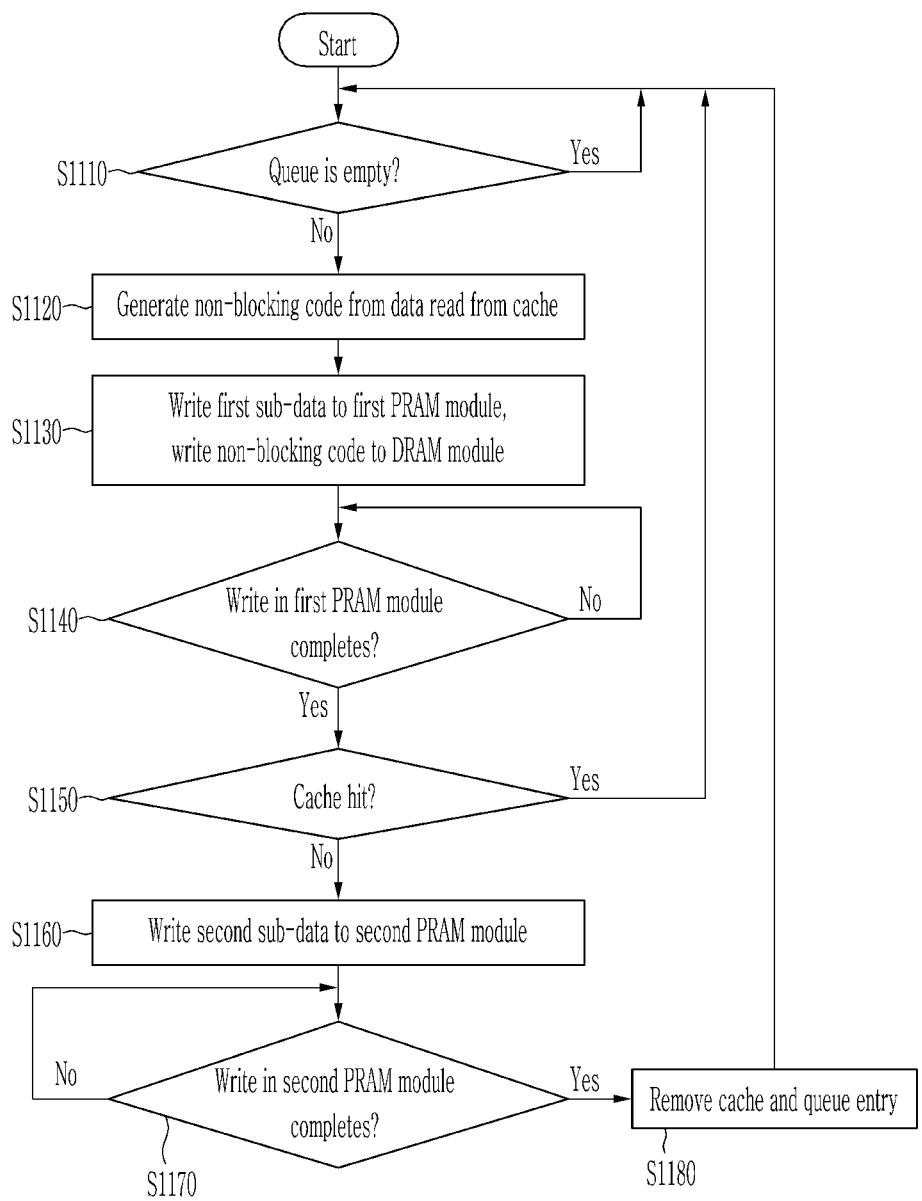
FIG. 11 is a flowchart showing operations of a migration module in a memory controller according to an embodiment of the present invention.

FIG. 11 is a flowchart showing operations of a migration module in a memory controller according to an embodiment of the present invention.

Referring to FIG. 11, a migration module (830 of FIG. 8 or FIG. 9) determines whether a cache 810 or 911 stores data to be migrated (S1110). In some embodiments, the migration module 830 may check whether a migration queue (912 of FIG. 9) is empty (S1110). If the migration queue 912 is empty, that is, the cache 810 or 911 stores no data to be migrated (YES in S1110), the migration module 830 waits until information of a new cache entry is added to the migration queue 912 (i.e., new data are stored to the cache 810 or 911).

If the migration queue 912 is not empty, that is, the cache 810 or 911 stores data to be migrated (NO in S1110), the migration module 830 reads the original data to be migrated from the cache 810 or 911, and generates a non-blocking code from a plurality of sub-data into the original data are divided (S1120). In some embodiments, the migration module 830 may read the data stored in a cache entry, corresponding to head information of the migration queue 912 (S1120). The migration module 830 writes the sub-data to a corresponding PRAM module through a corresponding PRAM channel, and writes the non-blocking code to a DRAM module (122c of FIG. 8 or FIG. 9) through a DRAM channel (123c of FIG. 8 or FIG. 9) (S1130). In some embodiments, the migration module 830 may first write only some of the plurality of sub-data to the corresponding PRAM module and write the non-blocking code to the DRAM module (S1130). In one embodiment, when the original data are divided into two sub-data, the migration module 830 may write one sub-data to the corresponding PRAM module (122a of FIG. 8 or FIG. 9) (S1130). In a case where the migration module 830 write all of the sub-data to the PRAM modules through all of the PRAM channels, a partition conflicts may occur by an incoming read request so that the read request can be blocked. Accordingly, the write for some sub-data may be first performed. Then, even if the partition conflict occurs in the PRAM module 122a by the read request, original data can be reconstructed by data read from other PRAM module (122b of FIG. 8 or FIG. 9) in which write is not being performed and a non-blocking code.

In some embodiments, when the write in the PRAM module 122a is completed (YES in S1140), the migration module 830 may write remaining some sub-data to the corresponding PRAM module (S1160). In one embodiment, when the original data are divided into the two sub-data, the migration module 830 may write the remaining sub-data to the corresponding PRAM module 122b (S1160).

In some embodiments, if a cache hit occurs for data which are being migrated (YES in S1150) before the remaining some sub-data are written to the corresponding PRAM module (S1160), the migration module 830 may stop migration without writing the remaining some sub-data. If the cache hit occurs for the data in the cache 911 while that data are being migrated to the PRAM modules, the migration may be stopped because it is necessary to preferentially process the requested data. If the cache hit does not occur (NO in S1150), the migration module 830 may write the remaining some sub-data to the corresponding PRAM module (S1160).

When the write for the remaining some sub-data is completed (YES in S1170), the migration module 830 removes the data in the corresponding cache entry from the cache 911 (S1180). In some embodiments, the migration module 830 may remove the queue entry from the migration queue 912 (S1180).

As described above, according to an embodiment of the present invention, because the write is first performed in the cache instead of the PRAM module having the long write latency, the long write latency in the PRAM module can be hidden. Because the write and read which may generate the partition conflict can be simultaneously performed, data of a read request can be provided without blocking the read request. Further, the data in the cache can be migrated to the PRAM module during an idle time of memory controller to clear the cache, thereby increasing the overall response speed of the memory system. Accordingly, the memory system according to an embodiment of the present invention can be used as a main memory of a CPU, and a non-volatile memory system can be provided unlike a DRAM.

In general, in order to provide memory persistence, data must be maintained when a computing device shuts down due to a power failure, and an operation must be able to be performed again at a position where the operation was stopped when the computing device is rebooted. To this end, a logging mechanism may be used to first search a log area at the reboot of the computing device, recover to a point at which the computing device was terminated, and drive the computing device.

Figure 12:
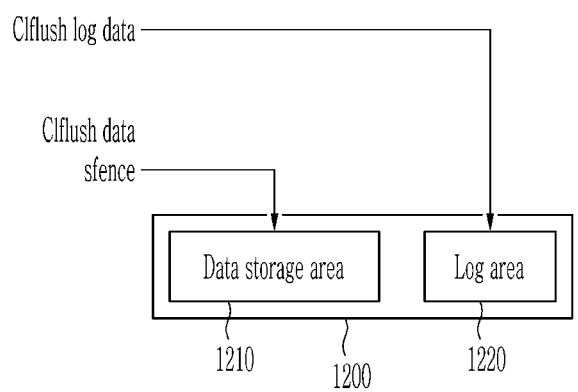
FIG. 12 is a drawing for explaining a logging mechanism in a memory system.

As shown in FIG. 12, for the logging mechanism, a log area 1220 as well as a data storage area 1210 exists in PRAM module 1200. When receiving a cache line flush instruction (clflush) for log data from a CPU, a memory controller stores data in a cache to the log area 1220. Next, when receiving a cache line flush instruction (clflush) for data and a fence instruction (sfence), the memory controller stores the data in the cache to the data storage area 1210 of the PRAM module. Therefore, when the computing device is rebooted after being shut down, data can be restored by the log data if the log data in the log area 1220 are normal. If the log data in the log area 1220 are abnormal, instructions can be determined as not being executed and be ignored. In this case, since the log data are redundantly stored in the log area 1220 before the data in the cache are stored in the data storage area 1210 of the PRAM module, data redundancy issue can occur and a speed at execution of instructions can be reduced.

However, according to an embodiment of the present invention, data stored in a cache (810 in FIG. 8 or 911 in FIG. 9) can be continuously written to PRAM modules which are non-volatile memories, through migration. In this case, when a volatile memory such as a DRAM is used as the cache 810 or 911, even if a power failure occurs, the data can be written to the PRAM modules through a backup battery before the data in the cache are lost. Accordingly, even if a logging mechanism is not used, memory persistency can be provided at the power failure. In some embodiments, the cache 810 or 911 may be implemented by a non-volatile memory, for example, an MRAM. In this case, even if the computing device shuts down due to the power failure, since data are stored in the non-volatile cache 810 and 911, the memory persistency can be provided without the logging mechanism, and the backup battery may not be used.

In some embodiments, a memory system according an embodiment of the present invention may be used as a storage device (e.g., 130 of FIG. 1) of a computing device.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A memory system comprising:
a memory subsystem including a plurality of first memory modules implemented by a phase-change memory and a second memory module implemented by a memory whose write speed is faster than that of the phase-change memory; and
a memory controller connected to the plurality of first memory modules and the second memory module via a plurality of channels, wherein the memory controller includes a cache that stores data of a write request in accordance with the write request from a CPU,
wherein the memory controller generates a non-blocking code from a plurality of sub-data into which original data are divided, writes the non-blocking code to the second memory module, writes the plurality of sub-data to the plurality of first memory modules, respectively, and reconstructs the original data from some sub-data of the plurality of sub-data which are read from some of the plurality of first memory modules and the non-blocking code read from the second memory under a predetermined condition at a read request,
wherein a memory cell array of each first memory module is partitioned into a plurality of partitions, and
wherein the predetermined condition includes a condition that a write operation is being performed in a partition to which some other sub-data of the plurality of sub-data are stored, and
wherein the predetermined condition further includes a condition that a cache miss occurs for the read request of the original data.

2. The memory system of claim 1, wherein in a case where the original data are stored in the cache, the memory controller, upon migrating the original data stored in the cache into the memory subsystem, writes the non-blocking code to the second memory module and writes the plurality of sub-data to the plurality of first memory modules, respectively.

3. The memory system of claim 2, wherein the plurality of sub-data include first sub-data and second sub-data, and wherein when writing the plurality of sub-data to the plurality of first memory modules, the memory controller writes the first sub-data to a corresponding first memory module among the plurality of first memory modules, and writes the second sub-data to a corresponding first memory module among the plurality of first memory modules after write of the first sub-data is completed.

4. The memory system of claim 3, wherein the memory controller removes the original data from the cache after the plurality of sub-data have been written to the plurality of first memory modules.

5. The memory system of claim 3, wherein when writing the first sub-data to the corresponding first memory module, the memory controller writes the non-blocking code to the second memory module.

6. The memory system of claim 3, wherein when a cache hit occurs for the original data while the original data are being migrated into the memory subsystem, the memory controller stops migrating the original data.

7. The memory system of claim 1, wherein the cache is implemented by a non-volatile memory.

8. The memory system of claim 1, wherein the memory system is a main memory used by a CPU of a computing device.

9. A memory controlling device connected to a memory subsystem including a first memory module and second memory module implemented by a phase-change memory and a third memory module implemented by a memory whose write speed is faster than that of the phase-change memory via a plurality of channels, the memory controlling device comprising:
a cache that stores data of a write request in accordance with the write request from a central processing unit (CPU); and
a memory controller that:
divides original data stored in the cache into a plurality of sub-data including first sub-data and second sub-data;
generates a non-blocking code from the plurality of sub-data;
writes the first sub-data to the first memory module, writes the second sub-data to the second memory module, and writes the non-blocking code to the third memory module, at migration; and
reconstructs the original data from the first sub-data read from the first memory module and the non-blocking code read from the third memory module without reading the second sub-data from the second memory module, under a predetermined condition at a read request from the CPU,
wherein a memory cell array of the second memory module is partitioned into a plurality of partitions,
wherein the predetermined condition includes a condition that a write operation is being performed in a partition in which the second sub-data are stored, and
wherein the predetermined condition further includes a condition that a cache miss occurs for the read request of the original data.

10. The memory controlling device of claim 9, wherein the memory controller writes one sub-data of the first and second sub-data to a corresponding memory module of the first and second memory modules, and write other sub-data of the first and second sub-data to a corresponding memory module of the first and second memory modules after write of the one sub-data is completed.

11. The memory controlling device of claim 10, wherein the memory controller removes the original data from the cache after the first and second sub-data have been written to the first and second memory modules.

12. The memory controlling device of claim 10, wherein the memory controller writes the non-blocking code to the third memory module when writing the one sub-data to the corresponding memory module.

13. The memory controlling device of claim 10, wherein when a cache hit occurs for the original data during the migration, the memory controller stops migrating the original data.

14. The memory controlling device of claim 9, wherein the cache is implemented by a non-volatile memory.

15. A memory system comprising:
a memory subsystem including a first memory module and second memory module implemented by a phase-change memory and a third memory module implemented by a memory whose write speed is faster than that of the phase-change memory via a plurality of channels; and
a memory controlling device connected to a memory subsystem, the memory controlling device comprising:
a cache that stores data of a write request in accordance with the write request from a central processing unit (CPU); and
a memory controller that:
divides original data stored in the cache into a plurality of sub-data including first sub-data and second sub-data;
generates a non-blocking code from the plurality of sub-data;
writes the first sub-data to the first memory module, writes the second sub-data to the second memory module, and writes the non-blocking code to the third memory module, at migration; and
reconstructs the original data from the first sub-data read from the first memory module and the non-blocking code read from the third memory module without reading the second sub-data from the second memory module, under a predetermined condition at a read request from the CPU,
wherein a memory cell array of the second memory module is partitioned into a plurality of partitions,
wherein the predetermined condition includes a condition that a write operation is being performed in a partition in which the second sub-data are stored, and
wherein the predetermined condition further includes a condition that a cache miss occurs for the read request of the original data.

* * * * *